No. 860,748. PATENTED JULY 23, 1907.
F. C. JACOBS.
HAY STACKER.
APPLICATION FILED MAY 2, 1907.
3 SHEETS—SHEET 1.
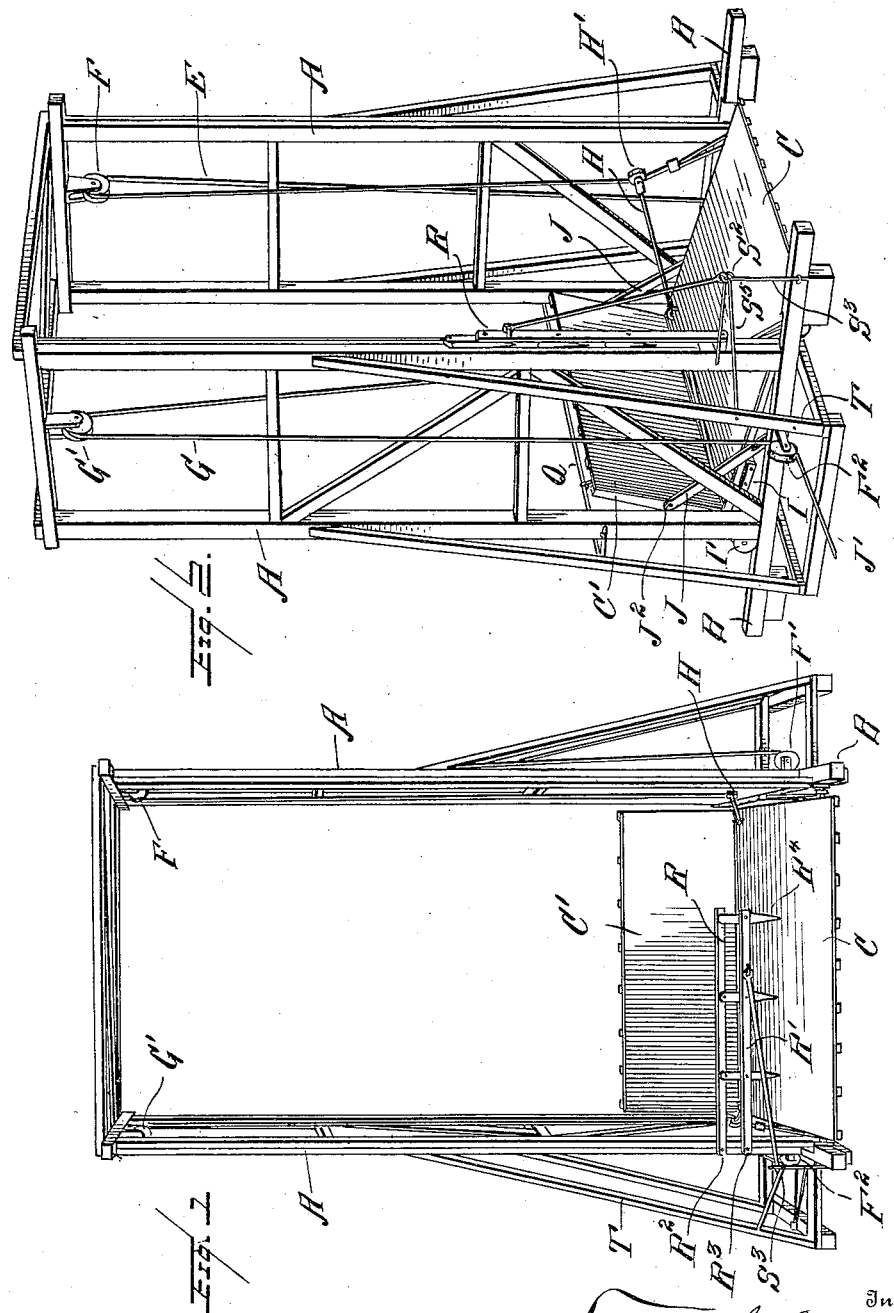

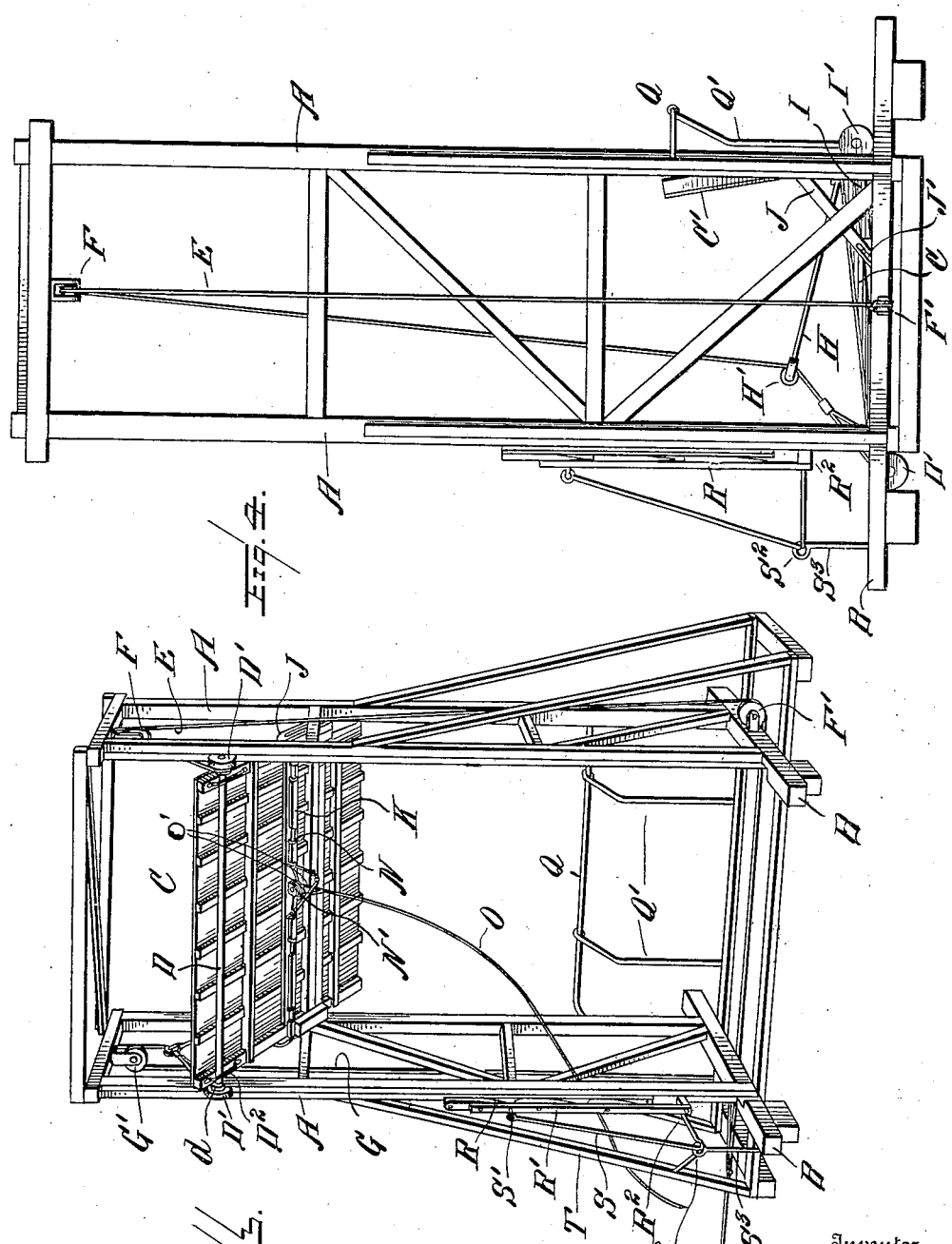

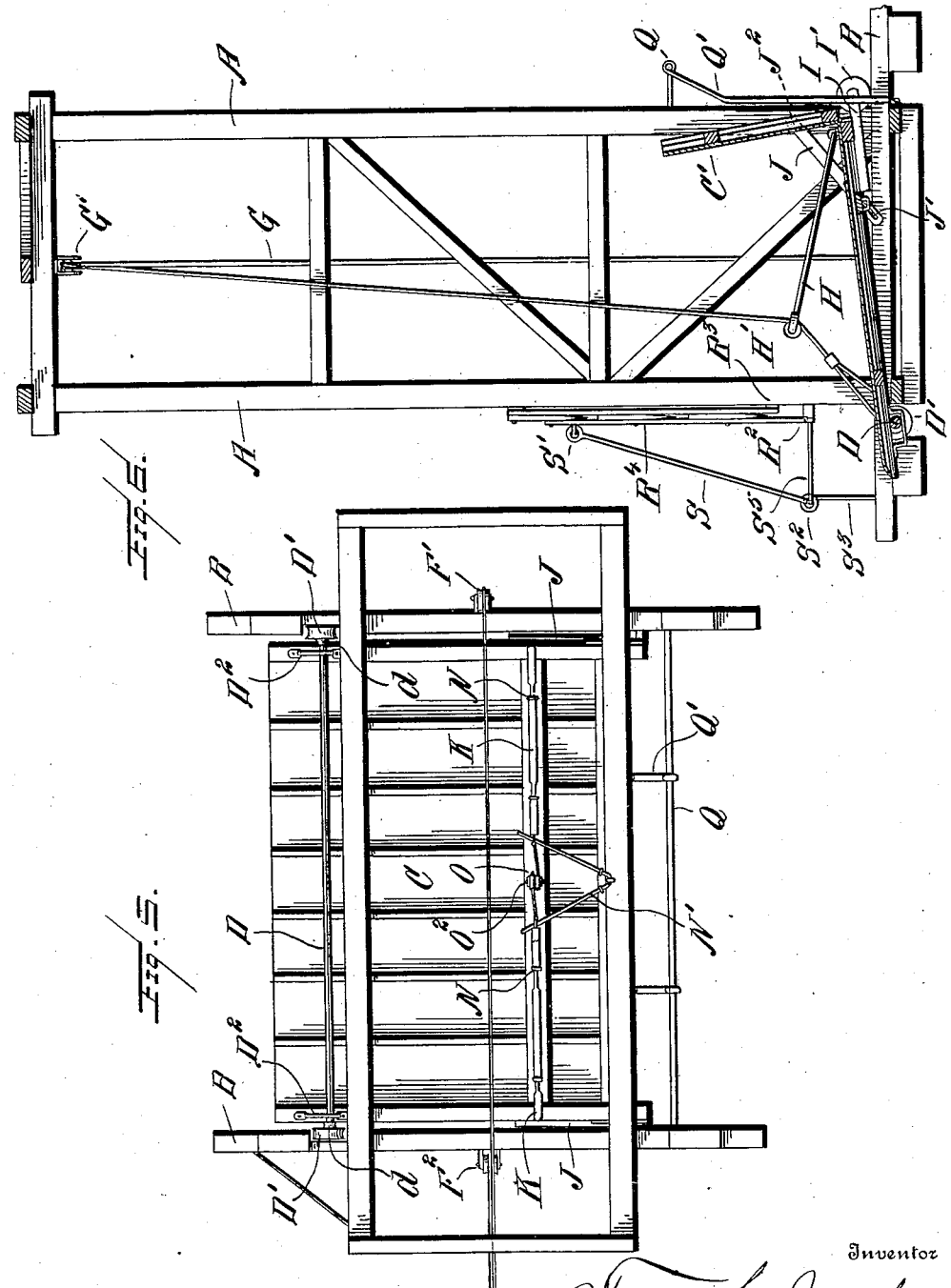

UNITED STATES PATENT OFFICE.

FRANK CLARK JACOBS, OF BOZEMAN, MONTANA.

HAY-STACKER.

No. 860,748.　　　　　Specification of Letters Patent.　　　　　Patented July 23, 1907.

Application filed May 2, 1907. Serial No. 371,522.

*To all whom it may concern:*

Be it known that I, FRANK CLARK JACOBS, a citizen of the United States, residing at Bozeman, in the county of Gallatin and State of Montana, have invented certain new and useful Improvements in Hay-Stackers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hay stackers, and consists in various details of construction and combinations and arrangements of parts which will be hereinafter fully described and then specifically defined in the appended claims.

I illustrate my invention in the accompanying drawings, in which:—

Figure 1 is a perspective view showing my improved hay stacker with the elevator at its lowest throw and illustrating the means for drawing the hay off from a bull rake upon the elevator platform. Fig. 2 is a similar view, showing the means for drawing the hay off the rake, folded up. Fig. 3 is a perspective view showing the elevator raised and tilted in position to dump the hay upon a stack. Fig. 4 is a side elevation. Fig. 5 is a bottom plan view of the elevator showing the latch mechanism for releasing the tilting back, and Fig. 6 is a sectional view through the apparatus, showing parts in elevation.

Reference now being had to the details of the drawings by letter, A, A designate four upright beams forming the corners of the apparatus which are supported upon suitable runners B, whereby the apparatus may be easily drawn from place to place.

C designates the elevator platform which has a back C' hinged thereto which, when the elevator is in position to be dumped, is adapted to be in alinement with the bottom C to allow the hay to slide freely therefrom.

Mounted underneath the forward end of the elevator is a shaft D having rollers D' fixed thereto, which pulleys are guided preferably against the convexed edges of two of the adjacent beams A against which they bear. Said shaft D is mounted to have a play in the elongated slots formed in the irons $D^2$ which are fastened to said platform of the elevator.

E designates a rope or cable which passes over a pulley F supported upon a cross-piece of the frame, one end of said rope being fastened to a pulley $d$ fixed to the shaft D. Said rope passes down underneath a pulley F', thence underneath the frame and under a pulley $F^2$, and has connected thereto a second rope G passing over a pulley G' and thence secured to a pulley $d$ upon the shaft D in the same manner as rope E is connected.

H, H designate rods having pulleys H' at their ends which are engaged, respectively, by the two ropes G and E, as shown clearly in the drawings. The lower ends of said rods H are forked and held by nuts to the elevator. Fixed to each end of the hinged back of the elevator is an angled shaft I, on the angled ends of which are mounted the rollers I' which are adapted to bear against the face of the upright posts A adjacent thereto as the elevator is raised and lowered.

J, J designate bars having elongated slots J' therein, which bars are pivoted at $J^2$ to the ends of the back and their slots are engaged by the ends of the latch bars K. Said latch bars are held by means of loops N through which they have reciprocating movements, and a spring N' which is of V-shape is fastened to the under side of the platform of the elevator and has its ends bearing against the inner ends of said slides N and held in place by staples, one fixed to the inner end of each latch bar. A trip rope O, having branching ends O' which pass over a double roller $O^2$, is fastened to said latch bars. By pulling upon said trip rope, said bars may be released from the slotted bar J to allow the back to fall down in alinement with the platform C. When said back falls down, the under edges of the bars J will contact with the angled ends of the bars I and hold the back from tilting farther.

For swinging the back C' to its normal position, I provide the transversely disposed bar Q, the ends of which are fastened to the uprights of the frame, and reinforced by the angled bars or rods Q' fastened at their lower ends to the cross-pieces of the frame and at their upper ends to the bar Q. When the elevator is lowered, the angled portions of the bars Q' will contact with the hinged back and throw the same up to a position at right angles to the platform, and when in this position, the latches or slides N will engage the slots J' and hold said back in such position.

In order to draw the hay from a bull rake, I provide the folding member shown in the drawings, consisting of the two bars R and R' which are pivoted, respectively, at $R^2$ and $R^3$ to one of the uprights of the frame, and are held in parallel relation by means of the pointed teeth $R^4$ which are pivotally connected to the two bars.

S designates a rod connected at S' to the bar R', and its other end is connected to an eye $S^2$ at the upper end of the rod $S^3$ which is fastened to the frame of the apparatus. The bar $S^3$ is further reinforced by means of the angled rod $S^5$, one end of which is fastened to an upright and its other end to a brace T on the side of the frame.

In operation, when the elevator platform is at its lowest limit, the hay to be elevated may be deposited upon the platform by positioning the bull rake over the platform and swinging the hay releasing member down to the position shown in Fig. 1 of the drawings. This being done, the rake is withdrawn and the hay deposited upon the platform without being rolled up, as would be the case if the hay were raked by the ordinary drag rake. By pulling upon ropes or cables which are connected together, the elevator may be raised to the desired height. As the elevator begins to rise, the ropes pulling upon the shaft D will cause the elevator to move backward until the rollers D' come in contact with the upright posts of the frame and in this position the load is elevated. When it is desired to dump the load, the trip rope is pulled upon which will cause the two latch bars to be drawn toward each other under the tension of the spring which bears against their inner ends, thus allowing the back to fall down in alinement with the elevator platform in an inclined position, thereby allowing the load to readily slide off by gravity.

After the hay is in readiness to be elevated, the rack which withdraws it from the rake may be folded up in the position shown in Fig. 2 of the drawings. On the return movement of the elevator as it is lowered, the back coming in contact with the angled rods J', will be swung back to a position shown at right angles to the platform and the spring connected to the ends of the slides or latches N will cause the latter to engage the slots of the bars J and the apparatus will be in readiness to elevate another load.

What I claim is:—

1. An apparatus for stacking hay, etc., comprising, in combination, a frame, a vertically movable elevator platform, a back hinged thereto, slotted bars pivotally connected to said back and platform, and sliding spring-actuated latches carried by the platform and adapted to engage the slots of said bars, whereby the back may be normally held at an angle to the platform, as set forth.

2. An apparatus for stacking hay, etc., comprising, in combination, a frame, an elevator platform and means for raising the same, a hinged back to said platform, slotted bars pivotally connected to said back and having sliding pivotal connection with the platform, spring-actuated latches mounted upon the platform and adapted to engage the slots of said bars, means for releasing the latches, bars secured to the rear of the platform and having angled stub shafts, and anti-friction rollers mounted upon said stub shafts and adapted to bear against the uprights of the framework, as set forth.

3. An apparatus for stacking hay, etc., comprising, in combination, a frame, rollers mounted thereon, a vertically movable elevator platform having a hinged back, means for releasing said back so that it will fall in alinement with the platform to dump its load, a shaft movably held in elongated slots in bearings upon the platform, cables secured to said shaft, and rods connected to the rear of the platform and having pulleys at their ends through which said cables pass, as set forth.

4. In combination, in a hay stacking apparatus, a frame, an elevator platform having a hinged back and means for raising and lowering said platform, a folding rack mounted upon the frame and adapted to be thrown horizontally over the platform when it is at its lowest throw, whereby hay, which is moved over the elevator by a rake, may be drawn off as the rake is withdrawn, as set forth.

5. An apparatus for stacking hay, etc., comprising, in combination, a frame, an elevator platform, means for raising and lowering the same, a rack comprising parallel bars pivoted to one of the uprights of the frame, teeth pivotally connecting said bars, an angled rod fixed to the frame, and connections between said rod and one of said parallel bars, as set forth.

In testimony whereof I hereunto affix my signature in the presence of two witnesses.

FRANK CLARK JACOBS.

Witnesses:
 HENRY I. JACOBS,
 J. H. WELLS.